(12) United States Patent
Kerns

(10) Patent No.: US 6,845,321 B1
(45) Date of Patent: Jan. 18, 2005

(54) METHOD AND SYSTEM FOR PROVIDING NARRATIVE INFORMATION TO A TRAVELER

(76) Inventor: Michael Lester Kerns, 2815 Plum Creek Pkwy., Medina, OH (US) 44256

( * ) Notice: Subject to any disclaimer, the term of this patent is extended or adjusted under 35 U.S.C. 154(b) by 27 days.

(21) Appl. No.: 10/610,489

(22) Filed: Jun. 30, 2003

(51) Int. Cl.[7] .............................. G06F 19/00; G06F 7/00
(52) U.S. Cl. .................. 701/209; 701/211; 342/357.01; 340/988
(58) Field of Search ................................ 701/201, 202, 701/204, 207, 208, 209, 211, 213; 342/357.09, 357.1; 340/988, 990, 995

(56) References Cited

U.S. PATENT DOCUMENTS

| | | | |
|---|---|---|---|
| 5,225,842 A | | 7/1993 | Brown et al. ................. 342/357 |
| 5,323,164 A | | 6/1994 | Endo .......................... 342/357 |
| 5,627,547 A | * | 5/1997 | Ramaswamy et al. .. 342/357.08 |
| 5,862,511 A | | 1/1999 | Croyle et al. ................ 701/213 |
| 6,169,514 B1 | | 1/2001 | Sullivan .................. 342/357.05 |
| 6,188,956 B1 | | 2/2001 | Walters ........................ 701/200 |
| 6,282,496 B1 | * | 8/2001 | Chowdhary .................. 701/220 |
| 6,360,167 B1 | | 3/2002 | Millington et al. .......... 701/211 |
| 6,362,751 B1 | | 3/2002 | Upparapalli ................. 340/995 |
| 6,374,180 B1 | * | 4/2002 | Slominski et al. ........... 701/208 |
| 6,381,540 B1 | | 4/2002 | Beason et al. ............... 701/213 |
| 6,484,094 B1 | * | 11/2002 | Wako .......................... 701/211 |
| 6,542,814 B2 | * | 4/2003 | Polidi et al. ................. 701/208 |
| 6,545,637 B1 | | 4/2003 | Krull et al. ............. 342/357.09 |
| 6,587,787 B1 | * | 7/2003 | Yokota ........................ 701/212 |
| 2003/0036848 A1 | * | 2/2003 | Sheha et al. ................. 701/209 |
| 2003/0182052 A1 | * | 9/2003 | DeLorme et al. ........... 701/201 |

* cited by examiner

*Primary Examiner*—Thomas G. Black
*Assistant Examiner*—Ronnie Mancho
(74) *Attorney, Agent, or Firm*—Alvin T. Rockhill

(57) ABSTRACT

The subject invention reveals a navigation system comprising: a position determining device; a means for associating each of a plurality of narrations with each of a plurality of locations, wherein each of the plurality of narrations relate to each of a plurality of points of interest; a means for associating each of a plurality of alert with each of the plurality of locations; a means for communicating alerts to the traveler as the traveler freely moves, wherein the alerts are communicated when the traveler moves within a specified proximity to the locations associated with the alerts, and wherein the alerts advise the traveler with respect to the point of interest; a means for providing the traveler with the option of obtaining directions to the point of interest; and a means for providing the traveler with the option of hearing the narration reading the point of interest.

22 Claims, 1 Drawing Sheet

METHOD AND SYSTEM FOR PROVIDING NARRATIVE INFORMATION TO A TRAVELER

BACKGROUND OF THE INVENTION

Electronic navigation devices employing GPS (global positioning system) receivers have become increasingly popular in recent years and the number of people using such devises is rapidly expanding. The utilization of GPS receiver devices in business and commercial applications continues to expand as does their use in recreational applications, such as pleasure trips. GPS units permit a user of the system to determine his or her position with respect to coordinates on the earth, such as longitude and latitude. Such navigation devices are extremely useful in assisting with the navigation vehicles of all types, including aircraft, marine craft, and land vehicles. Additionally, the devices are useful for tracking purposes, and hand held versions are popular with hikers and campers. Very generally, conventional electronic navigation devices employ a receiver that detects signals from a number of satellites orbiting the earth. The processor within the navigation device computes the location of the device, based upon data received from the received satellite signals, after a sufficient number of GPS satellite signals have been acquired. Particularly, once a sufficient number of GPS satellite signals are acquired, the device is able to calculate its position with respect to the various satellites, including longitude, latitude, and altitude. Thus, an electronic navigation device employing a GPS receiver has the ability to accurately compute the position of the device in real time, even as the device moves. Additionally, the device is able to calculate the velocity and direction in which the device is moving in three dimensions.

U.S. Pat. No. 5,323,164 discloses a satellite radio wave capturing method for global positioning system receiver. U.S. Pat. No. 5,225,842 reveals a vehicle tracking system employing global position satellites. The teachings of both of these patents are incorporated herein by reference in their entirety with respect to the operation of GPS units.

Users of navigation equipment seek intuitive representations of navigation information which are direct and simple to interpret. The ability of a navigation device to present navigation information in a manner that is simple to interpret is particularly important to individuals that may be preoccupied with other concerns, such as navigating a land vehicle, boat or aircraft. Recreational users, such as tourists and sightseers, normally prefer to enjoy their surroundings rather than to spend significant time interpreting displayed navigation data.

Conventional navigational devices have electronic maps stored in memory. Particularly, data indicative of geography and thoroughfares are stored in memory. When such conventional navigation devices are used in combination with a vehicle, such as an automobile, the navigation device calculates its location and provides an icon on the display screen, relative to displayed electronic map, to indicate to the operator of the vehicle the position and movement of the vehicle relative to surrounding geography. Typically, the electronic maps are displayed two dimensionally, although the electronic map data may also be transformed to a perspective view.

U.S. Pat. No. 6,188,956 discloses an electronic navigation device, and method, for selectively displaying the names of thoroughfares on the display of a navigation device. The device includes a housing for housing a processor, and a keypad input unit, a memory, a display having a display screen, and an antenna, all of which are connected to the processor. The navigation device is operable to acquire satellite signals from global positioning satellites and compute a geographic location of the device in a conventional manner. The navigation device and method of U.S. Pat. No. 6,188,956 is preferably incorporated in a unit to be mounted in a land vehicle, such as an automobile or truck. Cartographic data, including names of various geographical locations and, particularly, the names of thoroughfares, is stored in memory. In operation the electronic navigation device of U.S. Pat. No. 6,188,956 is mounted in a land vehicle. As the vehicle is navigated along a thoroughfare, the navigation device calculates its position, direction of travel, and velocity. Electronic map data corresponding to the geographic area surrounding the vehicle is displayed on the display of the navigation device. Utilizing the electronic map data and the current position of the navigation device, the processor determines which thoroughfare is being navigated in a conventional manner.

Current vehicle navigation systems may include a variety of position determining devices, such as GPS receivers, accelerometers., gyros, speedometers, compasses, and the like in order to determine the position of the vehicle relative to a database of roads. As is well-known, a user selects a destination in the database of roads and the navigation system guides the user along the roads to the destination. The known navigation systems permit the user to select a destination by category, such as a city, an exit on an expressway, or a street address. A user can also conventionally select from a wide variety of "points of interest" including restaurants, shopping, attractions, lodging, airports, or hospitals. In many cases subcategories are also provided, for instance under the general category of "restaurants" the device can provide specific listings for American, Asian, Barbecue, Chinese, Deli/Bakery, International, Fast Food, Italian, Mexican, Pizza, Seafood, Steak, Bagel/Donut, French, German, and the like For example, the user can select the category of "restaurants" at which point restaurants in a selected area or the closest restaurants will be displayed. Upon selection of the desired restaurant, the navigation system will guide the user via the roads In the database to the destination. Some current navigation systems guide the user to the destination via turn-by-turn instructions.

U.S. Pat. No. 6,360,167 discloses a vehicle navigation system with location-based multimedia annotations (text, graphics and/or audio) in several different ways. In the system of U.S. Pat. No. 6,360,167, "ads" comprising location-based multimedia annotations are periodically presented. These ads are presented based upon the current location of the vehicle relative to a location with which the ad is associated. In some cases the ads are displayed at power-up independent of vehicle location. The user also has the ability to request additional information associated with the ad. The additional information may be stored on the database of the navigation system, read by a removable media reader connected to the navigation system or received via a wireless communication system on the vehicle. This additional information may include text, graphics, audio and/or multimedia presentations which relate to the ad selected by the user.

The navigation system of U.S. Pat. No. 6,360,167 further provides a removable media reader which reads information from a removable media and provides that information to the navigation system, which operates based upon that information. For example, the removable media may include pre-stored routes, destinations, and additional location-based multimedia annotations. The navigation system of U.S. Pat. No. 6,360,167 also provides a wireless communication system which provides the ads and the additional information to the navigation system and its user. The ads may be utilized to help defray the cost of the navigation system to the purchaser or user. The removable media may also include audio data, such as audible turn instructions in a language other than that previously stored on the navigation system. The removable media may also include a code or codes which enable the navigation system or at least some functions of the navigation system. The code may be time specific, such that it only enables the system for a predetermined time period, or it may be geographically specific, such that it enables the navigation system to access additional geographic areas in its database. Alternatively, the code may be entered via the user input device.

Tourists traveling by automobile currently have the option to listen to audio tapes giving a narrative description of points of interest as they travel along certain major highways. However, such tapes are only available for certain highways and are limited to travel in a particular direction. In practice the user is typically instructed to manually turn the tape on at certain mile-markers along the highway and to turn it off after that segment of the narration is completed. This can lead to various problems, such as failure to turn the tape off after the narration for that particular portion of the highway has been completed or failure to turn the tape back on at the next specified mile-marker. Additionally, such audio tapes limit the travelers freedom to deviate from the specific route covered by the tape.

It would be highly desirable for such a narrative system to automatically alert the traveler to points of interest as he freely travels without being bound to a specific tour route along a specific highway or path along various highways. In fact, in some cases it would be highly beneficial for a traveler or sightseer to have the freedom to leave highways and to travel on his or her own desired course. For instance, a tourist could find this to be extremely useful while sightseeing in a point of interest rich environment, such as a national park or major city with many attractions, such as Washington, D.C. or Boston.

Current audio tape travel information systems do not offer any flexibility with respect to the content of the narrative information provided. It would, however, be desirable to give the traveler the ability to assign preferences with respect to the nature and level of detail given in the narrative description with respect to specific points of interest. For instance, the traveler might have particular interests in certain types of points of interest, such as museums and desire a more detailed description with respect to that particular point of interest, and optionally directions to the point of interest.

With conventional passive systems a traveler could miss a point of interest that is of a high level of personal interest to him or her simply because it was not on the predetermined tour route or because he or she was not prompted of the fact the point was within close proximity. For instance, the traveler could drive within a few short miles of a point of interest that he or she was extremely interested in without even being aware of that fact or having the option to be guided to it. Occasionally, travelers see things off in the distance of unknown identity, such as a distant mountain, a building, an island, a lake, or a monument, and wish to identify it. Conventional GPS systems do not provide such a feature.

SUMMARY OF THE INVENTION

The present invention relates to a method of communicating narrative information to a traveler moving freely through a geographic region. This system does not limit the traveler to a predetermined tour, route, or direction of travel, and it is preferably free of commercial advertisements. It can be used in a vehicle or can be carried by hand, for instance while walking or traveling by bicycle. It alerts the traveler to points of interest within a given radius of proximity to the traveler's present location. The traveler can set the radius of proximity within which he or she is alerted to existence of the particular point of interest. For instance, if the traveler is not particularly pressed for time and is traveling by automobile the radius of proximity can be set to be a relatively long distance. On the other hand, if the traveler is pressed for time or is traveling by foot it may be more appropriate to set to radius of proximity for an alert to a shorter distance.

The user of the system is given an alert when coming within geographic proximity to a point of interest. 1his alert is provided by the system without being prompted and minimizes the possibility of the traveler unknowingly missing the point of interest. In one embodiment of this invention the alert includes a relatively short narration describing the point of interest. The alert will typically include an indication of the distance and general direction to the point of interest and optionally directions from the user's present location to the point of interest. The user will preferably also be given the option to listen to a more detailed description of the point of interest in which the decision can be made independently of his decision to actually visit the point of interest. The system of the present invention also allows users to identify points of interest that can be seen in the distance, such as a mountain, a building, an island, a lake, or a monument, and optionally gives the user the ability to hear a narrative description of the point of interest identified in the distance. In some cases, particularly when the device is handheld, this is accomplished by using the GPS in conjunction with a magnetic compass.

The present invention more specifically discloses a method of communicating narrative information to a traveler moving through a geographic region, said method comprising: (1) associating each of a plurality of narrations with each of a plurality of locations within the geographic region, wherein each of the plurality of narrations relate to each of a plurality of points of interest within the geographic region; (2) associating each of a plurality of alerts with each of the plurality of locations within the geographic region; (3) communicating alerts to the traveler as the traveler freely moves throughout the geographic region, wherein the alerts are communicated when the traveler moves within a specified proximity to the locations associated with the alerts, and wherein the alerts advise the traveler with respect to the general nature of the point of interest associated with the location; (4) providing the traveler with the option of obtaining directions to the location associated with the point of interest; and (5) providing the traveler with the option of hearing the narration associated with the point of interest associated with the location.

The subject invention further reveals a navigation system comprising: a position determining device; a means for associating each of a plurality of narrations with each of a plurality of locations within the geographic region, wherein each of the plurality of narrations relate to each of a plurality of points of interest within the geographic region; a means for associating each of a plurality of alerts with each of the plurality of locations within the geographic region; a means for communicating alerts to the traveler as the traveler freely moves throughout the geographic region, wherein the alerts are communicated when the traveler moves within a specified proximity to the locations associated with the alerts, and wherein the alerts advise the traveler with respect to the general nature of the point of interest associated with the location; a means for providing the traveler with the option of obtaining directions to the location associated with the point of interest; and a means for providing the traveler with the option of hearing the narration associated with the point of interest associated with the location.

BRIEF DESCRIPTION OF THE DRAWING

Various embodiments of the subject invention are illustrated in the accompanying drawing.

DETAILED DESCRIPTION OF THE INVENTION

Figure 1:
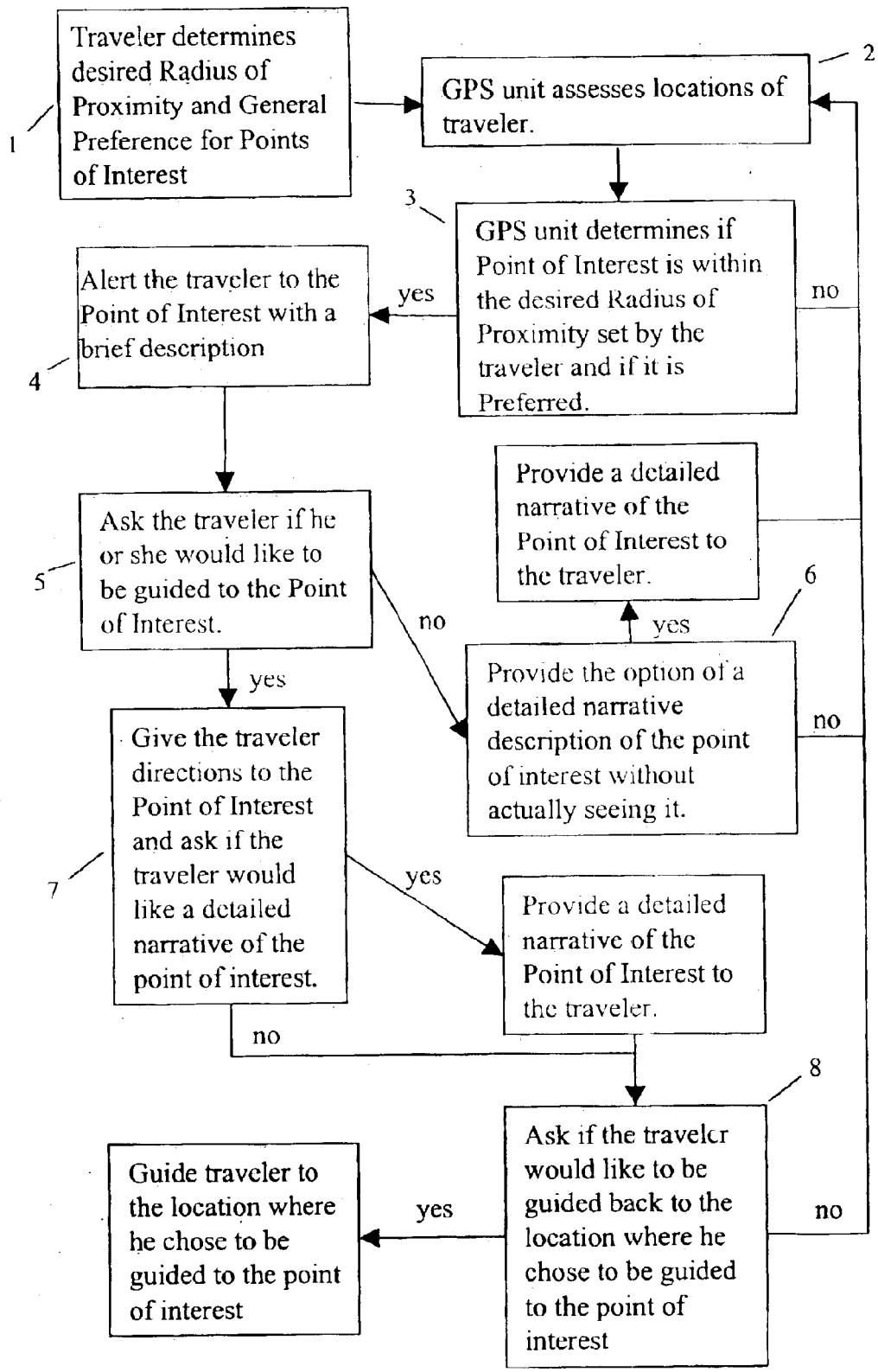
FIG. 1 illustrates by flow diagram the use of the navigation system and method of this invention.

The global positioning systems that can be utilized in the practice of this invention are electronic satellite navigation systems which permit a user of the system to determine his or her position with respect to the surface of the Earth. Global positioning is accomplished through the use of a GPS device which detects and decodes signals from a number of satellites orbiting the Earth. The GPS device can be hand-held or integrated into a motor vehicle, boat, or aircraft. The signals from each of these satellites indicate the position of the satellite and the time at which the signal was sent. To decode the satellite signals, known as spread spectrum signals, and thereby calculate the desired navigational data, a GPS receiver must first "find" or acquire the signals emitted from a minimum number of satellites. Once the receiver is "locked on" to the spread spectrum signals, continuous real-time calculation and monitoring of the user's global position and other navigational data (e.g., velocity of movement) can be performed.

GPS devices have clocks which are synchronized with clocks in each of the satellites to determine how long it takes the signals to travel from the satellites to the GPS device. In this regard, GPS devices require a highly accurate internal frequency reference in order to acquire the spread spectrum GPS satellite signals. Specifically, acquiring spread spectrum satellite signals from a sufficient number of satellites to perform calculations requires determining the frequency of oscillation of the crystal oscillator utilized in the GPS device.

Once the GPS device has acquired and decoded signals from a minimum of three satellites, the GPS device (receiver) can calculate the user's position (latitude and longitude) by geometric triangulation. Upon acquiring signals from a minimum of four satellites, the GPS device can also calculate the user's altitude. In addition GPS devices are able to calculate the user's speed and direction of travel by continuously updating the user's position. Accordingly, GPS devices are highly valuable and widely used in navigational systems because of their ability to accurately compute the user's position on or near the surface of the Earth in real-time, even as the user is moving.

Conventional GPS devices are unable to determine heading or direction information when the user of the GPS device is at a stand-still or has not traveled a sufficient distance to calculate the direction of travel. Accordingly, outdoor enthusiasts, such as a sightseers or hikers, who are often at a standstill or traveling less than a sufficient speed, must typically carry additional instruments, such as a compass, in order to instantaneously determine direction or heading information. In such cases, it is advantageous to utilize the GPS device in conjunction with a magnetic compass to obtain information relating to headings, such as the direction to various points of interest or direction of travel. However, carrying multiple such devices is inconvenient and is particularly cumbersome when hiking or biking.

In an attempt to overcome the foregoing with respect to determination of headings, it is beneficial to combine a GPS unit and a magnetic compass into one common unit. For instance, the X1000 unit by SILVA combines a GPS unit and an electronic compass. Such a device is further described by the teachings of U.S. Pat. No. 6,381,540, which are incorporated herein by reference in their entirety.

U.S. Pat. No. 6,381,540 describes a navigation device that includes a magnetic compass. The compass information is provided through a three-axis magnetic sensor and a two-axis tilt sensor. The three-axis magnetic sensor measures the strength of the earth magnetic field in each of the x, y, and z directions at the location of the navigation device, while the two-axis tilt sensor measures the orientation of the unit in pitch and roll as referenced to a known reference, such as the gravity vector (locally leveled tangent plane). The processor, and particularly the instrument software utilized by U.S. Pat. No. 6,381,540, takes this information and calculates a heading based upon the sensed magnetic field strengths and tilt information. This till information is used to reference the magnetic field data back to a level platform, so that accurate headings can be obtained. In this regard, as will be appreciated, without knowledge of tilt, the sensed x and y axis magnetic information cannot be transformed back to a level orientation. In order for accurate headings to be computed, the x and y sensor information must be referenced to a frame that is level, or at least substantially level, with the earth's surface at the location of the navigation device. The transformation of the sensed magnetic field strengths and tilt information to a heading is accomplished in a conventional manner, such as set forth in "3-D Vector Processing of Magnetometer and Inclinometer Data", by David Gibson Cave and Karst Science," Vol. 23, No. 2, October, 1996, pages 71–76; White Paper. "Nongimbaled Solid-State Compass" by Olson et al., Honeywell Technology Center, Minncapolis, Minn. and "Aerospace Avionics Systems: A Modem Synthesis" by George Siouris, Academic Press, 1993, page 35, each of which is incorporated herein by reference.

The addition of the magnetic and tilt sensors utilized by U.S. Pat. No. 6,381,540 allows for a compass setting to be displayed at any time with the unit in a wide variety of orientations, even when the user is standing still and moving at a slow speed. The addition of these sensors also allows for a moving map display to be realized when the user is standing still. Thus, it will be appreciated that by utilizing a magnetic compass in conjunction with a GPS device that even when a user is standing still, a heading may be determined, and that heading may be utilized to convey information relating to points of interest relative to the user's current position. Alternatively, a user can determine the identity of a point of interest by inputting its bearing relative to the users present position. This can be accomplished by manually inputting the bearing of the point of interest from the location of the user. Preferably the unit has a built-in magnetic compass as described in U.S. Pat. No. 6,381,540 in which case the point of interest can be identified relative to its orientation to the device. For instance, in a preferred embodiment of this invention the identity of a point of interest can be determined by pointing the device in the direction of the point of interest and inputting a request to identify the point of interest. In a highly preferred embodiment this can be accomplished by pointing the navigation unit at a given point of interest and pushing a button labeled as "Identify."

In some cases it is important for the device to be capable of operating at extremely low signal levels, such as those that might be encountered in a building or a vehicle, such as aircraft, while simultaneously being capable of rapidly acquiring the signal in the presence of large Doppler uncertainties associated with Low Earth Orbiting (LEO) satellite systems. U.S. Pat. No. 6,169,514 solves this problem by using the synchronization waveform rather than the data waveform for rapid acquisition of Doppler and code timing, and by transmitting a signal from the user terminal at a frequency that is proportional to the incoming frequency, thereby eliminating the absolute oscillator frequency as a source of error. This enables use of a more inexpensive oscillator, which broadens the number of practical applications of a geopositioning system.

One important aspect of U.S. Pat. No. 6,169,514 is the use of a synchronization signal with a short repetition interval. The receiver integrates over short time periods initially to produce a sequence of integrator outputs. These integrator outputs are then processed by a Fast Fourier Transform (FFT) algorithm to determine the Doppler frequency close enough for the receiver to operate. This estimate is not intended to provide the accuracy needed for precise positioning; that is provided by subsequent processing. However, this estimate is sufficient to enable the receiver to then quickly acquire the data waveform. In this implementation, the FFT acts, in effect, as a bank of parallel receivers, each tuned to a different part of the spectrum. The signal acquisition process is accelerated because part of the frequency search is performed by the FFT is parallel.

According to one aspect of U.S. Pat. No. 6,169,514, a method for receiving a signal, which includes a synchronization signal and a data signal, includes the steps of (a) integrating a synchronization signal with a short repetition interval over short time periods to produce a sequence of integrator outputs; (b) processing the integrator outputs with a Fast Fourier Transform algorithm to determine a Doppler frequency that is sufficiently close for the receiver to operate; and (c) using the Doppler frequency in subsequent receiver processing to receive the data signal.

There are at least three ways to implement the method U.S. Pat. No. 6,169,514. The first way, termed the serial single correlator implementation, further includes the steps of: (d) mixing the synchronization signal with a synchronization code generated by a code generator; (e) decimating the mixed synchronization signal and synchronization code to a length of a code used to create the synchronization signal; (f) delaying the decimated mixed synchronization signal and synchronization code with a plurality of delay elements to create a plurality of signals spaced at a code interval of the synchronization signal; g) transforming the plurality of signals from step (f) to a plurality of frequency related signals; and h) advancing a timing of the code generator until one of the plurality of frequency related signals in step g) exceeds a predetermined level.

U.S. Pat. No. 6,169,514 more specifically reveals a method for determining a position of a transceiver on the surface of the earth comprising the steps of: (a) transmitting a signal from the transceiver in response to a query from a signal from a satellite; (b) transmitting the response after a precisely controlled time interval after the transceiver receives the query; (c) estimating a length of a propagation path from the satellite to the transceiver from a time delay in the response; (d) measuring a Doppler shift in the response from the transceiver; (e) estimating a first derivative of a path length from the satellite to the transceiver from the measured Doppler shift; (f) estimating the satellite position and velocity from satellite telemetry data; (g) determining an angle between the direction of satellite motion and a line of bearing to the transceiver from the first derivative and the satellite position and velocity; and (h) determining a position of the transceiver on the surface of the earth as being one of two points where the surface of the earth intersects with a base of a cone defined by the angle in step g) and the estimated path length. The teachings, of U.S. Pat. No. 6,169,514 are incorporated herein by reference in their entirety.

The navigation system of this invention is comprised of a position determining device; a means for associating each of a plurality of narrations with each of a plurality of locations within the geographic region, wherein each of the plurality of narrations relate to each of a plurality of points of interest within the geographic region; a means for associating each of a plurality of alerts with each of the plurality of locations within the geographic region; a means for communicating alerts to the traveler as the traveler freely moves throughout the geographic region, wherein the alerts are communicated when the traveler moves within a specified proximity to the locations associated with the alerts, and wherein the alerts advise the traveler with respect to the general nature of the point of interest associated with the location; a means for providing the traveler with the option of obtaining directions to the location associated with the point of interest; and a means for providing the traveler with the option of hearing the narration associated with the point of interest associated with the location. The position determining device will typically be a GPS device as heretofore described.

The means for associating each of the plurality of narrations with each of the plurality of locations within the geographic region is typically a central processing unit (CPU). The CPU will typically have random access memory (RAM), read only memory (ROM), and a display, such as a high resolution liquid crystal display (LCD), cathode ray tube, or flat panel display. The CPU will also be connected to an input device, such as a mouse, keyboard, key pad, remote device, a touch screen display, or microphone in the case of voice commands. The utilization of voice commands is highly desirable when the device is integrated into a vehicle system. A touch screen display is an extremely user friendly mean for interfacing with the CPU.

In the case of hand held devices, the user input device is preferably a keypad comprising a plurality of direction arrows which operate together with the display to enter text, numbers, symbols, and the like or other alphanumeric characters. The characters can optionally be entered utilizing the character entry system disclosed in U.S. Pat. No. 6,362,751, which is hereby incorporated by reference.

The navigation system also includes at least one audio speaker for outputting sound from the CPU. The navigation system further includes a storage device, such as a hard drive, DVD, and/or CD ROM, connected to the CPU. The storage device contains a database including (a) all of the locations of the points of interest within the geographic region (area), (b) the names of the points of interest, (c) their associated narrations, (d) optionally, names, locations, and narrations relating to sub-points of interest associated with points of interest, and (e) optionally, the classification of the category into which the points of interest falls, such as a historical sites, museums, zoos, arenas, geological formations, or parks. The points of interest can be anything that may be of interest to a traveler or sightseer. For instance, the points of interest could be a battlefield, monument, geological formation, historical building, arena, museum, historical marker, and the like. The narrations will typically be entertaining and fact filled descriptions of the points of interest. The narrations will typically be provided by audio and optionally by appropriate video. The data base will also preferably include a map of all the roads in the area as well as the locations of potential destinations, such as addresses, hotels, restaurants, or previously stored locations (waypoints). The software for the CPU, including the graphical user interface, route guidance, operating system, position-determining software, etc may also be stored in storage device and/or in the RAM or alternatively in ROM or flash memory.

The locations of the points of interest within the geographic region will have alerts associated therewith. These alerts are triggered when the position determining device comes within a user-set proximity to the point of interest. In other words, the alert is given when the position determining device comes within a certain user-set radius of the point of interest, such as 0.25 miles for a hiker, 5 miles for a biker, 25 miles for a motorist operating under time constraints, or 50 miles for a motorist with leisure time. It should, of course, be understood that the user can set the radius value greater than that at which he or she is willing to travel for purposes of be entertained by hearing the alerts and narrations regarding the points of interest within the region. It should be understood that more than one point of interest may be within the user set radius of proximity and it such cases it is convenient for the alerts to be organized on the basis of their distance from the traveler, such as from closest to farthest. Points of interest can be classified into various general categories, such as historical sites, museums, zoos, arenas, geological formations, parks, and the like. The user can optionally be given the opportunity to select or deselect among these categories for which alerts will be given. In other words, the traveler may choose to only be given alerts with respect to parks or historical sites that come within his or her preset radius of proximity. In other words, the traveler modifies the locations within the geographic region which are associated with alerts on the basis of the categorization of the points of interest associated with the locations.

The alert will identify the point of interest and will optionally provide a relatively short description thereof. The user will also be provided with the option of obtaining directions to the location of the point of interest. In some cases the directions may be as simple as giving a bearing, such as by depicted by an arrow on a display screen, and the distance to the point of interest. In other cases, such as when the navigation system is mounted in a vehicle, the route to the point of interest will follow established routes, such as roads. In such cases, the navigation system calculates and displays a recommended route directing the user to the desired point of interest. Preferably, the navigation system displays turn-by-turn instructions on a display screen along with corresponding audible turn-by-turn instructions, guiding the driver to the desired destination. The navigation system optionally stores turn-by-turn and other instructions and phrases in several different languages. The system will also optionally provide the user with instructions for returning to the point where he or she was at the time that time of accepting instructions to the point of interest, such as the point where he or she deviated from their previous course of travel.

Upon reaching the point of interest, the traveler will optionally be given an opportunity to be presented with a more detailed narrative description and/or video relevant to the point of interest. The point of interest may also include sub-points of interest. The sub-points of interest are only activated upon the user coming within relatively short and appropriate predetermined radius of proximity to the sub-points of interest. This predetermined radius of proximity to the sub-points is preset in the database rather than being user defined. For instance, Mount Vernon, the home of George Washington, could be identified as a point of interest. A traveler choosing to be guided to Mount Vernon could upon arrival then be advised when he or she came within close proximity (typically within about 10 feet to about 500 yards) to various sub-points of interest within Mount Vernon. For instance, the traveler could be provided with detailed narrations relevant to their immediate surroundings, such descriptions of rooms and their contents, out-buildings and their functions, gardens, George Washington's grave, the dock, and even panoramic views of the Potomac River. In the cases of sub-points of interest it is particularly desirable for the navigation unit to include a built-in magnetic compass so that the traveler's attention can be directed to sub-points of interest. This is, of course, because the traveler will typically be moving slowly or standing still it should be understood that the user can be directed to any sub-point of interest of his or her choosing, for instance by selecting the sub-point from a listing of sub-points on a menu of sub-points within the "major" point of interest.

Some points of interest are relatively large and cannot be identified with a single is location. For example the Mississippi River has a shore line that runs for hundreds of miles. Nevertheless, travelers may desire to use the navigation unit to identify the Mississippi River and/or to obtain a narrative description of it. It is accordingly appropriate to associate numerous locations with such geographically large points of interest. For instance, it is appropriate to associate locations running the entire length of the Mississippi River with it as a point of interest. However, this could lead a traveler to receiving multiple alerts with respect to such single points of interest. It is accordingly preferred for the navigational device to issue only one alert with respect to a single point of interest within a predetermined unit of time, such as 1 hour or 1 day.

The navigation system optionally further includes a removable media reader connected to the CPU for reading a portable, removable storage media, such as a floppy disk, a CD ROM, a memory chip (such as RAM, ROM, EEPROM, etc), or any other magnetic, electronic, or optical or other storage media. The reader sends data from media to the CPU.

As will be described in more detail below, the removable storage media includes data which is used by the navigation system in its operation and/or a code or codes which enable one or more functions of the navigation system. The removable media includes data utilized by the navigation system, such as pre-stored routes, destinations, guided multimedia tours, narrations, or additional information regarding the routes or destinations or points of interest along the route. The removable media further includes an indicator of which of the previously stored languages the navigation system should use to generate the audible turn-by-turn instructions or, if necessary, also include the audio data, for generating the audible route guidance and other instructions in a language other than those previously stored on the CPU, such as Icelandic, Swedish, Flemish, German, French, Chinese, Italian, Spanish, Japanese, Korean, or Polish.

FIG. 1 is a flow diagram that depicts the use of the navigation system and method of this invention. The user, such as a traveler or sightseer, first determines his or her desired radius of proximity and general preference categories for points of interest for which alerts will be issued as depicted in box 1. The navigation unit including a GPS determines the present location of the user as depicted in box 2. The navigation unit then determines what if any points of interest falling into the user's selected categories of interest are within the user set radius of proximity to his or her present location as depicted in box 3. In the event that the navigation unit does not determine that any points of interest fall within the criteria to give an alert, it continues to monitor the location of the traveler with respect to known points of interest. On the other hand, if the navigation unit determines that points of interest falling within the criteria to give an alert are within the preset radius of proximity to the user an appropriate alert, preferably including a short narration describing the point of interest, will be provided as shown in box 4.

In the case that an alert is provided the traveler will be asked if he or she would like to be guided to the point of interest as shown in box 5. If the travel chooses not to be guided to the point of interest he or she will be given the option of hearing a detailed narration relating to the point of interest while they proceed to travel freely as shown in box 6. In the event that the traveler selects to be guided to the point of interest the navigation unit will preferably provide some form of direction for travel to the point of interest and upon arrival the traveler will be given an option of being provided with a narrative description relating to the point of interest as shown in box 7. After being provided with the narration or rejecting the narration the traveler will be given the option of receiving some form of direction back to the point where he or she chose to be guided to the point of interest as illustrated in box 8.

While certain representative embodiments and details have been shown for the purpose of illustrating the subject invention, it will be apparent to those skilled in this art and modifications can be made therein without departing from the invention.

What is claimed is:

1. A method of communicating narrative information to a traveler moving through a geographic region, said method comprising:

(1) associating each of a plurality of narrations witch each of a plurality of locations within the geographic region, wherein each of the plurality of narrations relate to each of a plurality of points of interest within the geographic region;

(2) associating each of a plurality of alerts with each of the plurality of locations within the geographic region;

(3) communicating alerts without being prompted to the traveler as the traveler freely moves throughout the geographic region, wherein the alerts are communicated when the traveler moves within a specified proximity to the locations associated with the alerts, and wherein the alerts advise the traveler with respect to the general nature of the point of interest associated with the location;

(4) providing the traveler with the option of obtaining directions to the location associated with the point of interest; and (5) providing the traveler with the option of hearing the narration associated with the point of interest associated with the location.

2. A method as specified in claim 1 wherein the specified proximity to the locations associated with the alerts is provided by the traveler.

3. A method as specified in claim 1 wherein the method further comprises showing the traveler the direction to specific points of interest within the geographic region.

4. A method as specified in claim 3 wherein the points of interest are organized on the basis of their proximity to the traveler within the geographic region.

5. A method as specified in claim 4 wherein the points of interest are organized from closest to farthest from the location of the traveler.

6. A process as specified in claim 3 which further provides a narrative description of sub-points of interest, wherein the sub-points of interest have alerts which are activated by coming within a radius of proximity which is preset in the a database rather than being user defined.

7. A method as specified in claim 6 wherein the radius of proximity is less than about 500 yards.

8. A method as specified in claim 1 wherein said alerts and said narrations are free of commercial advertisements.

9. A method as specified in claim 1 which further comprises identifying a point of interest based upon its bearing to the location of the traveler.

10. A method as specified in claim 9 wherein the bearing of the point of interest to the traveler is inputted to determine the identity of the point of interest.

11. A method as specified in claim 10 wherein the bearing of the point of interest to the traveler is inputted by pointing a navigation unit at the point of interest.

12. A method as specified in claim 10 wherein the bearing of the point of interest to the traveler is inputted by pointing a directional indicator at the point of interest, wherein the directional indicator includes a magnetic compass.

13. A method as specified in claim 9 which further comprises providing the traveler with the option of bearing the narration associated with the identified point of interest.

14. A method as specified in claim 9 wherein the bearing of the point of interest relative to the location of the traveler is determined witch a magnetic compass.

15. A method as specified in claim 1 wherein the traveler modifies the locations within the geographic region which are associated with alerts.

16. A method as specified in claim 15 wherein the traveler modifies the locations within the geographic region which are associated with alerts on the basis of the categorization of the points of interest associated with the locations.

17. A method as specified in claim 1 wherein the traveler is further provided with an option of seeing a video message which further describes the point of interest.

18. A method as specified in claim 17 wherein the video message is a motion picture.

19. A method as specified in claim 1 wherein multiple locations are associated with a single point of interest.

20. A method as specified in claim 1 wherein only one alert is communicated to the traveler within a predetermined unit of time in the case of alerts that are associated with a single point of interest that is associated with multiple locations.

21. A navigation system comprising: a position determining device; a means for associating each of a plurality of narrations with each of a plurality of locations within the geographic region, wherein each of the plurality of narrations relate to each of a plurality of points of interest within the geographic region; a means for associating each of a plurality of alerts with each of the plurality of locations within the geographic region; a means for communicating alerts without being prompted to the traveler as the traveler freely moves throughout the geographic region, wherein the alerts are communicated when the traveler moves within a specified proximity to the locations associated with the alerts, and wherein the alerts advise the traveler with respect to the general nature of the point of interest associated with the location; a means for providing the traveler with the option of obtaining directions to the location associated with the point of interest; and a means for providing the traveler with the option of hearing the narration associated with the point of interest associated with the location.

22. A navigation system as specified in claim 21 wherein the position determining device is a global positioning system.

* * * * *